United States Patent [19]

Flory et al.

[11] Patent Number: 5,086,690
[45] Date of Patent: Feb. 11, 1992

[54] BOOSTER INTERLOCK DIVIDER AND DIAPHRAGM CONCEPT

[75] Inventors: Donald M. Flory, Arcanum; Clark D. Moore, West Carrollton; Craig A. Osterday, Dayton; Edward J. De Hoff, Huber Heights, all of Ohio

[73] Assignee: General Motors Corporation, Detroit, Mich.

[21] Appl. No.: 692,888

[22] Filed: Apr. 29, 1991

[51] Int. Cl.$^5$ .............................................. F01B 19/00
[52] U.S. Cl. ........................................ 92/48; 92/98 R; 91/376 R; 91/533
[58] Field of Search ............... 92/48, 96, 98 R, 98 D; 91/369.1, 369.2, 376 R, 533

[56] References Cited

U.S. PATENT DOCUMENTS

| | | | |
|---|---|---|---|
| 2,989,035 | 6/1961 | Stelzer | 92/48 |
| 3,613,506 | 10/1971 | Kytta | 92/48 |
| 4,279,193 | 7/1981 | Satoh | 92/48 |
| 4,345,506 | 8/1982 | Ohomi | 91/376 R |
| 4,495,854 | 1/1985 | Hibino | 92/48 |

FOREIGN PATENT DOCUMENTS

| | | | |
|---|---|---|---|
| 1927945 | 5/1969 | Fed. Rep. of Germany | 92/48 |
| 2920249 | 11/1979 | Fed. Rep. of Germany | 92/48 |
| 2915185 | 1/1980 | Fed. Rep. of Germany | 92/48 |

Primary Examiner—Edward K. Look
Assistant Examiner—Thomas Denion
Attorney, Agent, or Firm—Ernest E. Helms

[57] ABSTRACT

A peripheral sealed interlock for a dual diaphragm tandem vacuum booster with front and rear housings is provided. An outer radial peripheral end of a divider of the inventive interlock is greatly simplified and in the preferred embodiment a bead of a secondary diaphragm is allowed to seal on a rear housing member as well as with the periphery of the divider. The interlock provides a simplified design allowing independent compression of primary and secondary diaphragm beads while at the same time providing an interlock which require lower compression for assembly and sealing.

6 Claims, 2 Drawing Sheets

BOOSTER INTERLOCK DIVIDER AND DIAPHRAGM CONCEPT

FIELD OF THE INVENTION

The field of the present invention is that of vehicle pneumatically actuated dual diaphragm tandem brake boosters.

DISCLOSURE STATEMENT

Tandem vacuum boosters are well known, having been used in automotive vehicles for many years. Essentially thee comprise a booster housing having a single power piston which is axially movable by differential pressure The power piston is connected with dual diaphragms. In cooperation with a fixed divider which surrounds the power piston, the diaphragms separate the booster housing into two vacuum chambers and two variable pressure chambers.

A valve mechanism for the booster will admit atmospheric air into the variable pressure chambers (the variable pressure chambers are normally at vacuum pressure when the booster is in the release position), to actuate the booster. The diaphragms are rubber like, each of which has an inner portion secured to the power piston and an outer peripheral portion secured to the booster housing. The divider wall is placed between the diaphragms between and is appropriately sealed to separate the constant vacuum chamber of one diaphragm from the variable pressure chamber for the other diaphragm.

The above arrangement requires sealing at the outer periphery of each of the two diaphragms as well as for the divider wall with respect to the booster housing. A sealing arrangement is also required for intersection of the front and rear booster housing sections.

In some instances a passage within the power piston connects the two vacuum pressure chambers. Another separate passage of the power piston connects the two variable pressure chambers. The passage connecting the variable pressure chambers are selectively connected with the atmosphere by valve action when the booster is to be actuated.

Most booster designs provide an interlock between the housing sections which also acts to form a union between the enlarged peripheral ends of the diaphragms, (commonly referred to as a bead or bead head) with the end of the divider.

Prior interlocking union designs presented two problems. The first problem was that due to the complexity of the union, the divider peripheral ends were often bent in rather extreme contorsions requiring fairly complex and expensive stamping operations. Secondly, several critical dimensions are effected by the interlock. The distance of the divider to front housings is critical to avoid interference with the primary and secondary diaphragm support plates upon actuation and rest positions respectively The union also effects the distance of the rear housing to an air valve (mounted in the piston) which effects total stroke. Therefore placement of the divider with respect to the rear housing should be held to the minimum tolerance practical to help to minimize dead time (the amount of travel of the push rod before actuation of the master cylinder occurs). Additionally it is desirable that the union be formed in such a manner that the compression of the beads of the primary and secondary diaphragms be independent of one another and also the compressive force required for forming the union and the subsequent sealed union should be minimized.

SUMMARY OF THE INVENTION

The present invention provides a peripheral sealed interlock for a dual diaphragm tandem vacuum booster with front and rear housings. The outer radial peripheral end of the divider of the inventive interlock is greatly simplified and in the preferred embodiment the bead of the secondary diaphragm is allowed to seal on the rear housing member as well as with the periphery of the divider. The interlock provides a simplified design allowing independent compression of the primary and secondary diaphragm beads while at the same time providing an interlock which require lower compression for assembly and sealing.

It is an object of the present invention to provide a peripheral interlock for a dual tandem vacuum booster.

Other objects, desires and advantages of the present invention can become more apparent to those skilled in the art as the nature of the invention is better understood from the accompanying drawings and a detailed description.

DETAILED DESCRIPTION OF THE DRAWINGS

Figure 1:
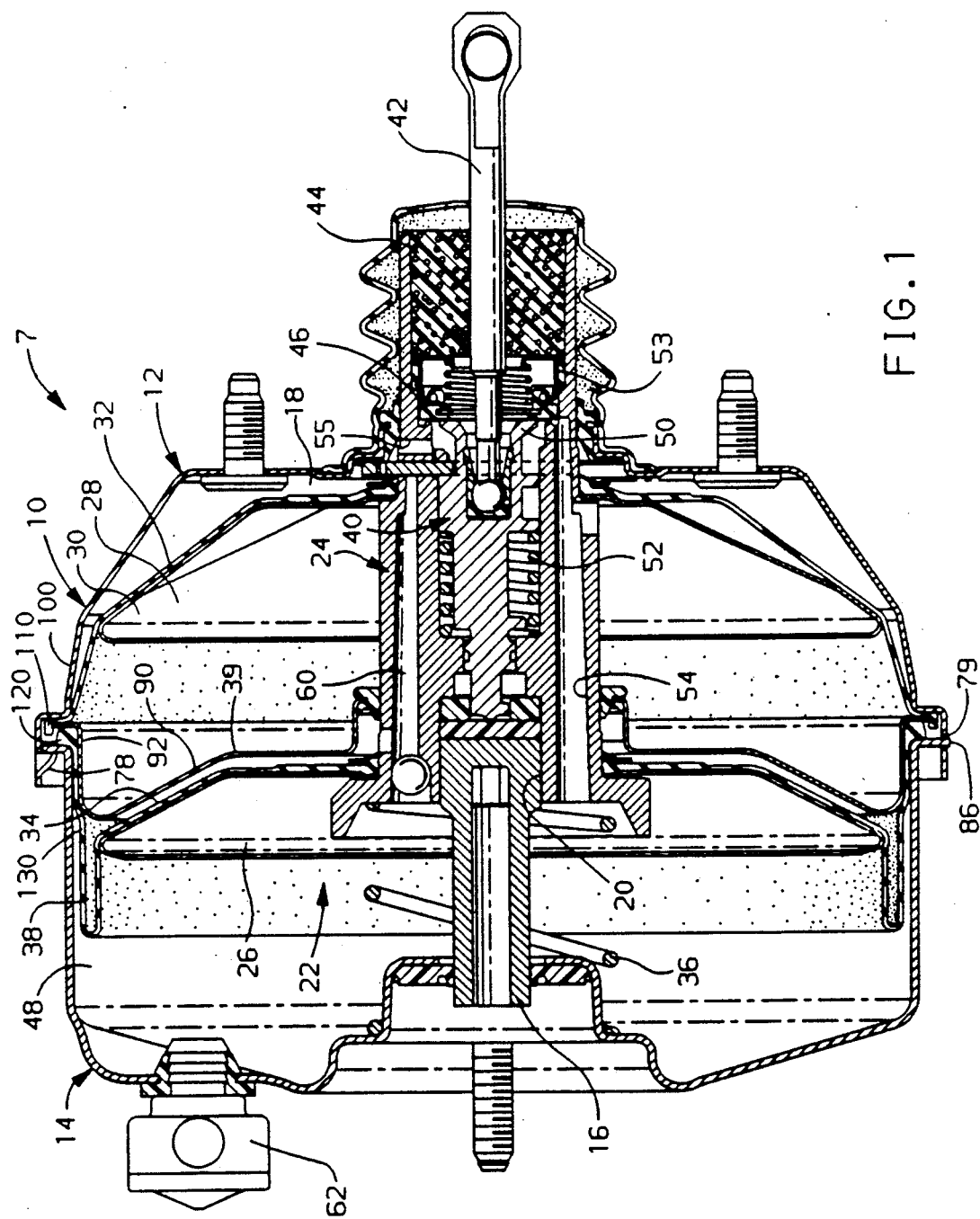
FIG. 1 is a sectional view of a preferred embodiment vehicle master cylinder booster with an interlock according to the present invention.
Figure 2:
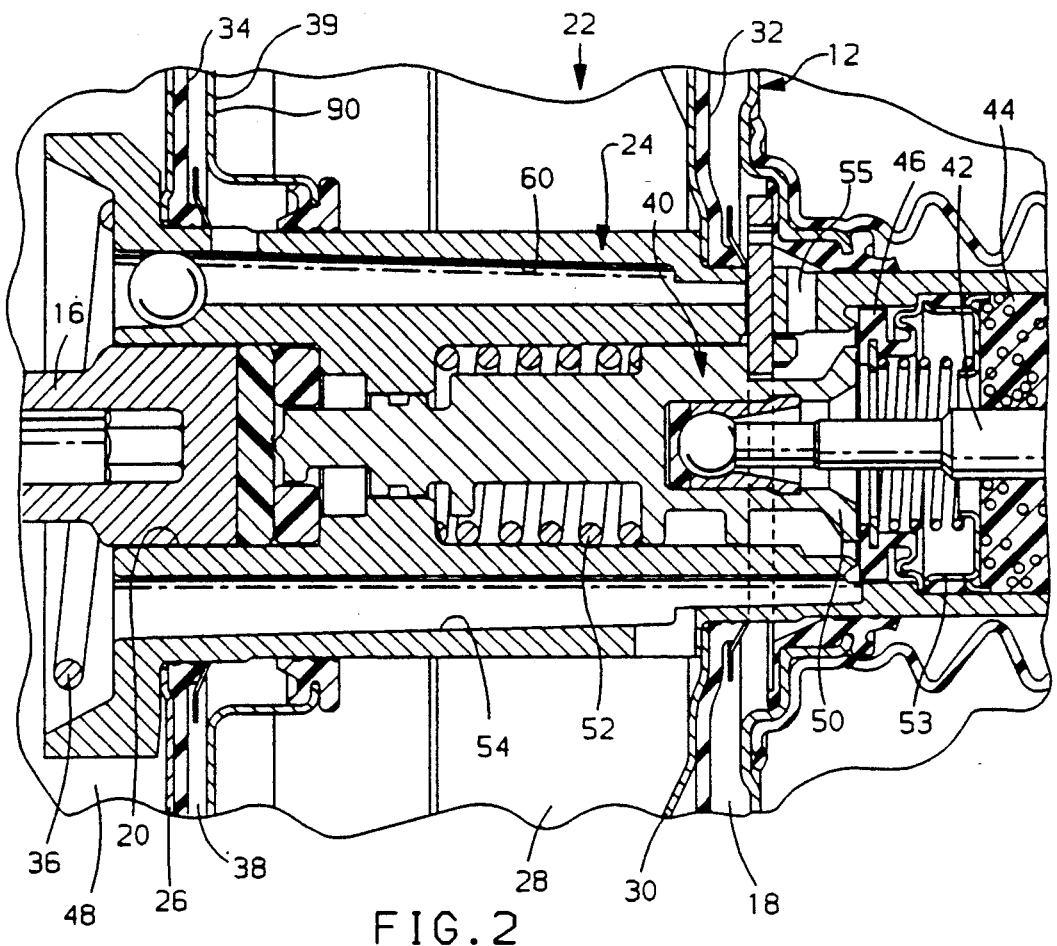
FIGS. 2 and 3 are enlarged views of portions of FIG. 1.
Figure 3:
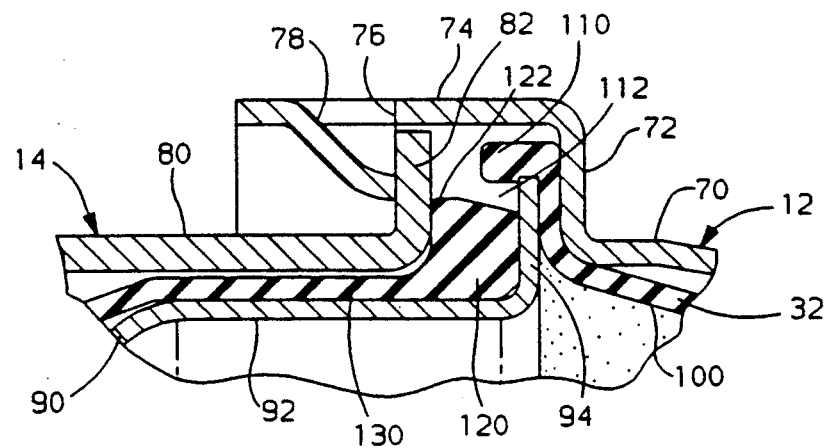

Referring to FIGS. 1, 2 and 3 a vehicle dual diaphragm tandem vacuum booster assembly 7 includes a booster housing 10 having a rigid front and rear housing section 12/14. The booster 7 has an ouput rod 16 inserted within a bore 20 of a power piston assembly 22. The piston assembly 22 includes a piston 24, a front or secondary diaphragm support 26 and a rear or primary diaphragm support 30. Sealably connected with the piston 24 are a rear primary and front secondary diaphragms 32,34.

The piston 24 is illustrated in the release position. The piston 24 is normally urged to released position by a power piston return spring 36. An air control valve assembly 40 is received within a rear portion of the piston 24 and is actuated by suitable well known means such as a push rod 42 which is in turn connected with a brake pedal (not shown). Since the booster 7 is a vacuum suspended booster, the control valve assembly 46 is so positioned that in the release position, the first, second, third and fourth booster assembly power chamber control volumes 18, 28, 38, 48 are at vacuum pressure. The control volumes 28 and 38 are separated by a pressure boundary formed by a rigid divider 39 which is fixed with respect to the front and rear housings 12, 14 but is slidably sealably associated with the piston 24. Control volumes 18 and 38 are variable pressure chambers joined by passage 60 of the piston 24. Control volumes 28 and 48 are usually held at a vacuum and are connected by a passage 54 of the piston 24. A check valve 62 exposes control volumes 28 and 38 to the engine manifold when vacuum is available.

To activate the booster 7 the push rod 42 pushes against a spring 52 to remove a tip 50 of the air valve assembly 40 from a floating control valve 46 (which is fitted within the piston 24 by a retainer 53). The above allows atmospheric air to pass through a filter 44, pass the tip 50, through a piston radial passage 55 and into control volume 18 and 38 (via passage 60) and a connecting passage (not shown) between radial passage 55 and passage 60. The entrance of atmospheric air causes a pressure force to act against the supports 30 and 26 causing the piston to move leftward as shown causing the rod 16 to actuate a master cylinder (not shown).

A more detailed explanation of the working of master cylinder boosters can be gained by a review of U.S. Pat. No. 4,881,452 commonly assigned.

The present invention provides a novel interlock for the booster assembly 7. The rear housing 12 has a generally axially extending portion 70 (as utilized in this application the term generally axially extending includes that portion of the rear housing 12 which is parallel or diagonal to the line of travel of the power piston) joined to a second generally radial portion 72. Joining the second radial portion 72 is a third axially extending portion 74 extending in a direction opposite the first portion of the rear housing. The third portion 74 also has a series of slots 76 allowing a tab 78 of the rear housing 12 to be deformed radially inwardly.

The front housing 14 (which inserts in the rear housing third portion) has a first axially extending portion 80 joined thereto by a second radial portion 82 which in the embodiment illustrated is generally parallel to the second radial portion 72 of the rear housing 12. The third portion 74 of the rear housing 12 overlaps the second portion 82 of the forward housing except where the front housing second portion has extended locator tabs 86 (FIG. 1) which extend through locator slots 79 to locate front housing 14 within the rear housing 12.

The divider 39 has a interior portion 90 and along its outer edge has a generally axially extending portion 92 joined to a second radially extending portion 94 which is captured between the second portions 72, 82 of the rear and front housing.

The rear 32 (primary) diaphragm has an inner diameter connected with the piston 24 and has an outer diameter joined to the interlocked union. The rear diaphragm 32 has a generally thin section 100 with a flag like projecting bead head 110 overlapping the divider second portion 94. The thin 100 section of the rear diaphragm is sealably adjacent the second portions of the rear housing and the divider 72,94. The bead head 110 in some instances can seal upon the second and third portions of the rear housing along with the radial end edge of the divider. The rear diaphragm 32 forms a pressure boundary and the first control volume 18 with the rear housing 12 and the second control volume 28 with the divider 39. If ever compressed the bead head 110 will have a tendency to bend over and fill up a gap 112 radially inwardly.

The forward (secondary) diaphragm 32 is also flexible providing a pressure boundary and forming the third control volume 38 with the divider 39 and the fourth control volume 48 with the front housing 14. The bead head 120 of the secondary diaphragm has an apex 122 which slopes radially inwardly towards the divider second portion 94 and has a thin section 130 adjacent to the generally axially extending portion 92 of the divider. The secondary diaphragm bead head 120 taper causes the bead head under compression to have a tendency to deform towards the gap 112 radially outwardly towards the bead head 110 of the rear diaphragm. The presence of the gap 112 between the bead heads 110-120 lowers the compression required for assembling the interlocked union together.

Since the primary and secondary diaphragm bead heads are radially separated (or concentrically separated in the direction of travel of the piston 24) from each other compression due to the axial joining of the front and rear housings 12,14 provides independent compression of the bead heads 120, 110. Therefore the final position of the rest housing 14 is more predictable. The locational placement of the divider 39 with respect to the rear housing 12 is fairly well set and will slightly vary only by the amount of compression of the relatively thin section 100 of the rear diaphragm 32 which is a very slight amount. Therefore variances in the assembly and the location of the divider 39 between different boosters assemblies 7 will be minimized.

While an embodiment of the present invention has been explained, it will be really apparent to those skilled in the art of the various modifications which can be made to the present invention without departing from the spirit and scope of this application as it is encompassed by the following claims:

We claim:

1. An interlock peripheral union for a vehicle vacuum actuated tandem dual diaphragm brake booster, the union in combination comprising:

a rigid first housing member providing a first pressure boundary having a first generally axially extending portion with a second radial flange portion joined thereto and a third generally axially extending portion joined to the second portion extending in a direction opposite the first axially extending portion, the third axially extending portion having a series of slots allowing a portion of the third portion to be deformed radially inwardly forming tabs;

a rigid second housing member providing a pressure boundary, the second housing member having a generally axially extending first portion and a second radial flange portion joined to the first portion, the second portion providing a surface for contact with the first housing member third portion tabs;

a rigid divider providing a pressure boundary between the first and second housing members, the divider having a first portion extending generally axially and a second portion joined to the first portion extending generally radially outward being captured between the second portions of the first and second housing members;

a flexible first diaphragm providing a pressure boundary forming a peripherally sealed first control volume with an adjacent first or second housing member and a second peripherally sealed control volume with the divider, the first diaphragm having a bead head joined to a generally thin section, the thin section being adjacent to the second portion of the adjacent first or second housing member with the bead head overlapping the generally radial portion of the divider, and the first diaphragm sealing on both of the second portion of the adjacent housing member and against the second portion of the rigid divider member; and a second flexible diaphragm providing a pressure boundary forming a peripherally sealed third controlled volume with the divider and a fourth peripherally sealed controlled volume with an adjacent first or second housing member, the second diaphragm having a bead head joined to a generally thin section, the second diaphragm bead head sealing against the second portion of the other of the housing members that the thin portion of the first diaphragm seals against and the second diaphragm bead head seals against the generally radial portion of the divider.

2. An interlock peripheral union as described in claim 1 wherein the first housing is a rear housing of the booster.

3. An interlock peripheral union as described in claim 2 wherein the thin portion of the first diaphragm is adjacent the second portion of the rear housing.

4. An interlock peripheral union as described in claim 1 wherein there exists an annular gap between the first and second diaphragm bead heads before assembly and the gap is provided for allowing space for the deformation of the diaphragm bead heads during assembly.

5. An interlock peripheral union as described in claim 1 wherein the bead of the second diaphragm is tampered between the edges of the bead of the second diaphragm making contact with the divider second portion and the housing second radial flange portion.

6. An interlock peripheral union for a vehicle vacuum actuated tandem dual diaphragm brake booster, the union in combination comprising:

a rigid rear housing member providing a first pressure boundary having a generally first axially extending portion with a second radial flange portion joined thereto and a third axially extending portion joined to the second portion extending in a direction generally opposite the first portion, the third axially extending portion having a series of tabs deformed radially inwardly;

a rigid forward housing member providing a pressure boundary, the forward housing having a generally axially extending first portion and a second radial flange portion joined to the first portion, the second portion being insertable within the third portion of the rear housing and the front housing second portion providing a surface for contact with the rear housing third portion tabs;

a rigid divider providing a pressure boundary between the first and second housings, the divider having a first portion extending generally axially and a second portion joined to the first portion extending generally radially outward being captured between the second portions of the rear and forward housing;

a first flexible diaphragm pressure boundary having a bead head joined to a generally thin section, the thin section being adjacent to the second portion of the rear housing with the bead head overlapping the second portion of the first diaphragm thin section forming a peripherally sealed first control volume with the rear housing and a peripherally sealed second control volume with the divider.

a second flexible diaphragm providing a pressure boundary and a third peripherally sealed controlled volume with the divider and a fourth peripherally sealed controlled volume with the forward housing, the second diaphragm having a bead head and a generally thin section, the bead head being sealed against the second portion of the divider and the second portion of the forward housing and the bead head having a taper along its sealed edge with the second portion of the divider and the second portion of the divider wherein under compression said bead head deforms radially outward into an annular gap, and the second diaphragm generally thin section being adjacent to the generally axially extending portion of the divider.

* * * * *